C. P. WILLIAMS.
SLIP SOCKET.
APPLICATION FILED MAY 14, 1918.
1,285,523.
Patented Nov. 19, 1918.
2 SHEETS—SHEET 1.
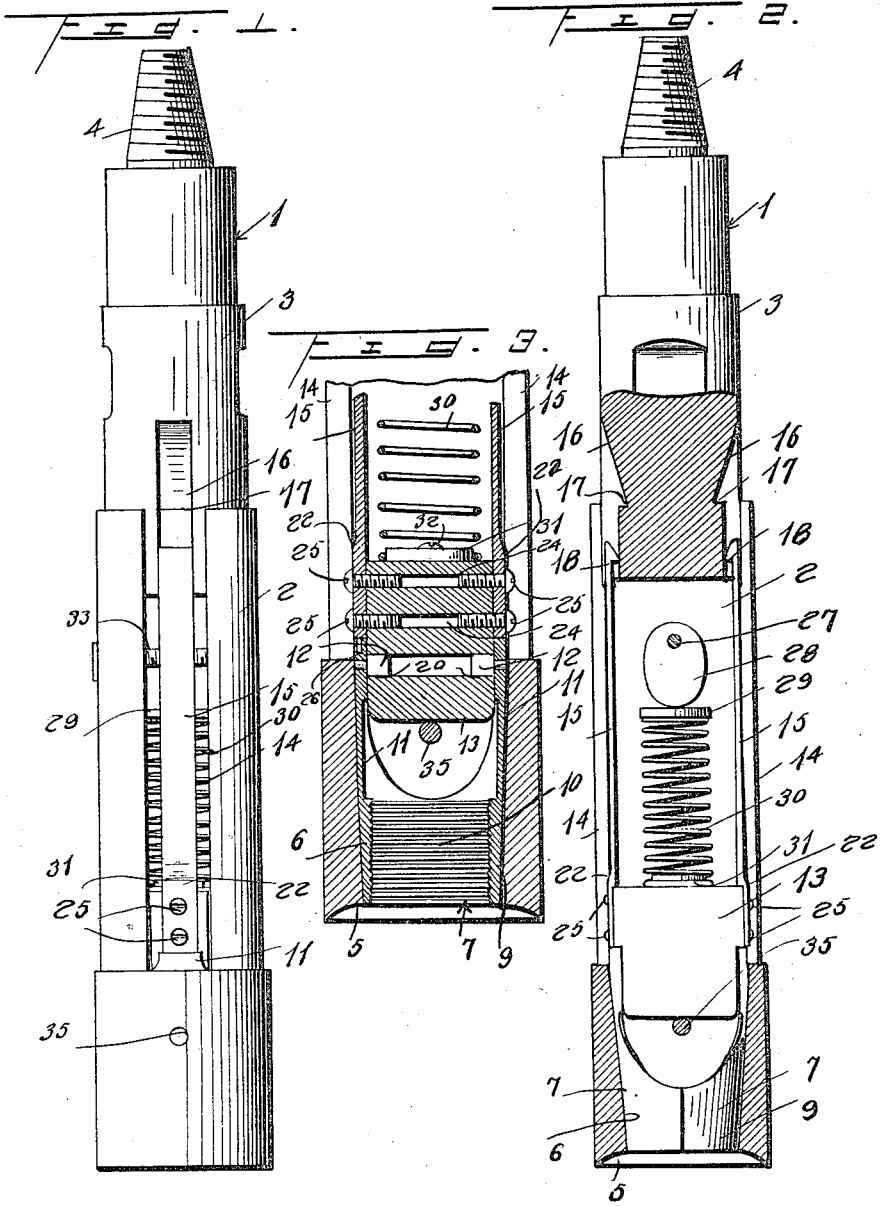
Inventor
C. P. Williams.

C. P. WILLIAMS.
SLIP SOCKET.
APPLICATION FILED MAY 14, 1918.
1,285,523.
Patented Nov. 19, 1918.
2 SHEETS—SHEET 2.
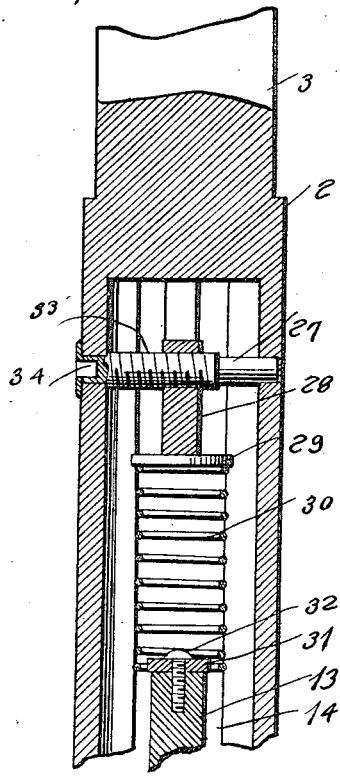
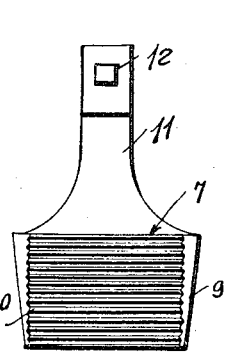
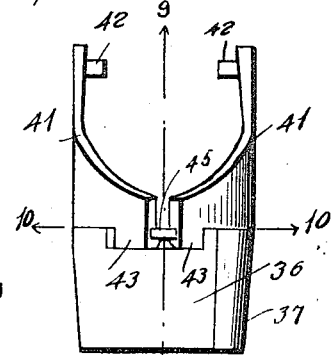
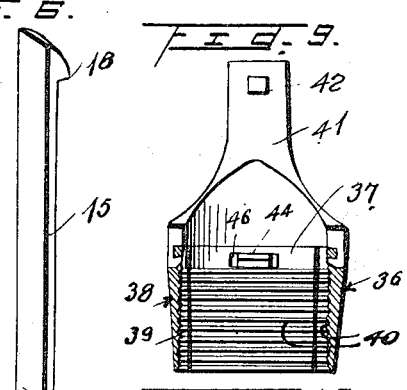
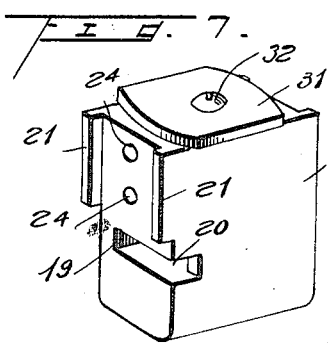
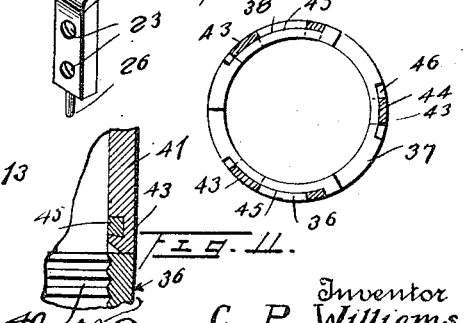
Inventor
C. P. Williams.

UNITED STATES PATENT OFFICE.

CLARENCE P. WILLIAMS, OF SYRACUSE, OHIO.

SLIP-SOCKET.

1,285,523.  Specification of Letters Patent.  Patented Nov. 19, 1918.

Application filed May 14, 1918. Serial No. 234,463.

*To all whom it may concern:*

Be it known that I, CLARENCE P. WILLIAMS, a citizen of the United States, residing at Syracuse, in the county of Meigs and State of Ohio, have invented certain new and useful Improvements in Slip-Sockets; and I do hereby declare the following to be a full, clear, and exact description of the invention, such as will enable others skilled in the art to which it appertains to make and use the same.

This invention relates to slip sockets and is an improvement on Patent 1,194,910 issued to me August 15, 1916.

The primary object of the invention is to provide an improved slip socket of simple and durable construction which will be efficient in use, and one that can be manufactured and placed upon the market at a reasonable cost.

Another object of the invention is to provide an improved means for releasing the reins from their latched position after the same have been raised by the head into inoperative position to release the tool.

A further object of the invention is to provide an improved means for returning the head and slips to their operative position after the tool has been released and the reins unlatched.

A still further object of the invention is to provide an improved slip socket, in which the tool can be readily released, having a minimum number of parts, so as to prevent the possibility of the socket from becoming worn or broken.

With these and other objects in view the invention consists in the novel construction, arrangement and formation of parts, as will be hereinafter more specifically described, claimed and illustrated in the accompanying drawing, forming a part thereof in which:

Figure 1 is a side elevation of the improved slip socket,

Fig. 2 is a vertical horizontal section through the improved slip socket, showing parts of the same in elevation, Fig. 3 is a fragmentary detail horizontal section taken through the lower portion of said socket, Fig. 4 is a fragmentary vertical section through the upper portion of the socket at right angles to Fig. 3, Fig. 5 is a detail elevation of one of the slips, Fig. 6 is a detail perspective view of one of the reins, Fig. 7 is a detail perspective view of the head carrying the reins and slips, Fig. 8 is a detail elevation of the modified form of the slips, Fig. 9 is a detail section taken on the line 9—9 of Fig. 8, Fig. 10 is a detail horizontal section taken on the line 10—10 of Fig. 8, and Fig. 11 is a detail horizontal section through the modified form of the slip, showing the manner of connecting the arms to the slip.

Referring to the drawings in detail, wherein similar reference numerals designate corresponding parts throughout the several views, the numeral 1 generally indicates the improved slip socket, which includes a cylindrical shell or body 2 having formed on its upper end a solid head 3, which is provided with the conventional tapered threaded terminal 4 by means of which the body is connected to suitable rods or other supports by which the socket is lowered in the well casing. The lower end of the shell 2 is counter sunk as at 5 and the inner face of the lower terminal of the socket and immediately above the counter sunk portions 5 is tapered inwardly and downwardly as at 6 and a pair of slips 7, each of which is substantially semi-cylindrical are slidably mounted in the tapered portion. The outer surfaces of the slips 7 are tapered inwardly and downwardly as at 9 and the inner surfaces are serrated as at 10 for engaging a tool or the like, which has become lodged in the well casing. The upper ends of the slips 7 are provided with upwardly extending reduced arms 11 having inwardly extending lugs 12 by means of which the same are connected to the head 13. The shell 2 is provided with diametrically opposed vertical slots 14, which extend from the solid head portion 3 to the tapered inner surface 6 of the lower portion of the socket and the slots communicate with the bore of the shell and slidably receive the reins 15, which are connected to the head portion 3, which will hereinafter be more fully described. The solid head portion 3 is provided with diametrically opposed grooves 16, which communicate with the slots 14 and the grooves are provided with shoulders 17, which are adapted to be engaged by the inwardly extending teeth 18 formed on the upper ends of the reins 15.

The head 13 is of substantially rectangular shape and is slidably mounted in the shell 2 directly above the tapered inner walls 6. The opposite end walls of the same are provided with inwardly extending recesses 19 in which are adapted to fit the lugs 12 of the slips 7, by means of which the slips and heads are united.

A slot 20 extends from one of the side faces of the head 13 to one of the recesses 19, and this slot forms means whereby the slips can be readily attached to the head, when the device is being assembled.

The upper portions of the end faces of the head 13 is provided with flanges 21, which form a guide way for receiving the lower ends of the reins 15 which are enlarged as at 22 and the enlarged portion of the reins are provided with apertures 23 which registers with apertures 24 formed in the head; and suitable detachable fastening elements 25 are adapted to extend through the registering apertures to secure the reins in position on the head. The reins 15 carry a downwardly extending pin 26, which is adapted to fit in a recess formed in the upper end of the arms of the slips and forms a positive connection between the same. When the head 13 is in its raised position the slips 7 and the reins 15 are carried therewith and the slips are carried out of the tapered portion and are allowed to expand and the teeth carried by the reins 15 engage the shoulders 17 and thus hold the slips in inoperative position.

A shaft 27 is journaled in the shell 2 directly below the solid head 3 and carries a cam 28, which is adapted to rest against the plate 29 carried by the upper end of the expansion coil springs 30, which has its lower end bearing against the head 13. A plate 31 is secured, by means of a screw 32 or other suitable fastening element, to the upper surface of the head 13 which forms a means for receiving the lower end of the spring 30. The spring 30 is arranged to normally hold the head 13 in its lowered position, so as to hold the slips 7 in their operative position. The shaft 27 has a portion thereof threaded as at 33 by means of which the cam 28 is secured in position.

One end of the shaft is provided with a squared recess 34 which is adapted to receive a suitable tool, by means of which the shaft 27 can be rotated. The cam 28 is of sufficient length to be brought into engagement with the reins 15 when the shaft is turned, and forms means for forcing the teeth 18 out of engagement with the shoulders 17 when the reins 15 are in their inoperative position, and upon further turning of the cam, the enlarged portion thereof will engage the plate 29 and thus increase the tension of the spring 30 and forcibly push the head 13 in its lowered position.

A stopper bolt 35 extends diametrically across the lower end of the shell 2 and is adapted to engage the lower surface of the head 13 and forms means for limiting the upward movement of the slips 7, when the same are engaging a tool, so as to prevent the slips from riding upward into inoperative position. The stopper bolt 35 can either be made of frangible material or can be made so that the same can be readily removed. In operation of the improved device the socket is lowered into the well casing and when the tool, that has been lodged in the well casing, enters the shell 2 and into the slips 7 the socket is raised, and the slips 7 will ride downward and the tapered wall 6 will force the slips toward each other and into tight engagement with the tool and thus prevent the removal thereof.

When it is desired to remove the tool from the socket, the socket is raised and is then rapidly lowered, so as to strike the tool against the ground, which in turn will break the frangible pin 35 and force the head 13 upward, which will carry the reins 15 therewith and thus move the slips 7 into inoperative position and allow the same to release the tool. The teeth 18 engage the shoulders 17 and prevent the slips from lowering until the tool has been released. The shaft 27 is then rotated, so as to bring the cam into engagement with the reins 15 and force the teeth 18 out of the shoulders 17 and then the shaft is further rotated so as to bring the cam into engagement with the plate 29, which will increase the tension of the spring and forcibly carry the head 13 downwardly and the slips 7 into their operative position.

In Figs. 8 to 11 is illustrated a slightly modified form of the slips and in this form the slips are formed in three sections 36, 37 and 38, each of which is formed substantially a third of a cylinder.

The outer surfaces of the sections 36, 37 and 38 are gradually tapered inwardly and downwardly as at 39 and the inner surfaces are provided with serrations 40, whereby the same can readily engage a tool. The sections are provided with detachable arms 41 which are gradually tapered toward their upper ends and provided with inwardly extending lugs 42. The lower surface of the arms 41 are provided with downwardly extending inwardly projecting teeth 43, which are positioned at the side edges of the arms and one of the arms is provided with a centrally downwardly projecting tooth 44. The upper ends of the sections 36, 37 and 38 are provided with transverse slots and the slots in the sections 36 and 38 are arranged adjacent to one side edge and the slot 46 in section 37 is arranged intermediate its side edges. The slot 46 is arranged to receive the central tooth 44 of one of the arms and the other slots 45 are arranged to receive the teeth formed on the side edges of the arms. This construction provides means whereby the slips can be readily separated from the arms when so desired.

In practice, I have found that the form of my invention, illustrated in the accompanying drawings and referred to in the above description, as the preferred embodiments, is the most efficient and practical; yet realizing the conditions concurrent with the adoption of my device will necessarily vary, I desire to emphasize the fact that various minor changes in details of construction, proportion and arrangement of parts may be resorted to, when required, without sacrificing any of the advantages of my invention as set forth.

What I claim as new is:

1. A device of the class described, a hollow shell, shoulders formed on the shell, a head slidably mounted in the shell, slips detachably connected to the head, resilient reins carried by the head and arranged to engage the shoulders to hold the slips in operative position, spring means engaging the head and normally holding the slips in operative position, and adjustable means for engaging the spring to vary the tension thereof to forcibly push the head into operative position.

2. A slip socket comprising a hollow shell, a head slidably mounted in the shell, slips in the shell and detachably connected to the head, a stopper pin arranged transversely of the shell and intermediate the head and slips, and arranged to limit the upward movement of the slips, reins carried by the head, shoulders formed on the shell, inwardly extending teeth formed on the reins and adapted to engage the shoulder when the head is in its raised position, and means for engaging the reins to force the teeth out of engagement with the shoulders.

3. A slip socket comprising a hollow shell, a head slidably mounted in the shell, slips detachably connected to the head, reins carried by the head, shoulders formed in the shell, inwardly extending teeth formed on the reins and adapted to engage the shell, a stopper bolt arranged transversely of the shell and below the head, a movable cam carried by the shell, an expansion spring between the head and cam, the cam being adapted to engage the reins, as and for the purpose specified.

4. A slip socket comprising a shell, three part slips carried in the shell, detachable arms carried by the slip parts, a head slidably mounted in the shell, means detachably connecting the arms to the head, reins carried by the head, spring means engaging the head, shoulders formed in the shell, and means formed on the reins for engaging the shoulders, as and for the purpose specified.

In testimony whereof I affix my signature in presence of two witnesses.

CLARENCE P. WILLIAMS.

Witnesses:
D. H. Peoples,
C. E. Gillelan.

Copies of this patent may be obtained for five cents each, by addressing the "Commissioner of Patents, Washington, D. C."